United States Patent
Ueda et al.

(10) Patent No.: US 11,513,529 B2
(45) Date of Patent: Nov. 29, 2022

(54) AUDIO SYSTEM AND METHOD OF CONTROLLING CONVEYER DEVICE

(71) Applicant: Yamaha Corporation, Hamamatsu (JP)

(72) Inventors: Taku Ueda, Toyohashi (JP); Hisashi Nagai, Hamamatsu (JP); Naoaki Kurita, Hamamatsu (JP); Yuji Sakurai, Hamamatsu (JP); Hisanobu Suzuki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 167 days.

(21) Appl. No.: 16/904,795

(22) Filed: Jun. 18, 2020

(65) Prior Publication Data

US 2020/0401156 A1 Dec. 24, 2020

(30) Foreign Application Priority Data

Jun. 21, 2019 (JP) .............................. JP2019-115262

(51) Int. Cl.
*H04R 3/00* (2006.01)
*G05D 1/02* (2020.01)
*H02J 7/00* (2006.01)

(52) U.S. Cl.
CPC ........ *G05D 1/0225* (2013.01); *H02J 7/00034* (2020.01); *H02J 7/0048* (2020.01); *H04R 3/00* (2013.01); *G05D 2201/0211* (2013.01)

(58) Field of Classification Search
CPC .......... H04R 29/00; H04R 3/00; H04R 25/30; H02J 7/0048; H02J 7/00034
USPC ............................................... 381/58–59, 111
See application file for complete search history.

(56) References Cited

U.S. PATENT DOCUMENTS

| | | | |
|---|---|---|---|
| 8,731,974 B2 * | 5/2014 | Pandhi | G06Q 40/08 705/4 |
| 10,758,100 B2 * | 9/2020 | Cohen | H02J 7/00714 |
| 11,154,170 B2 * | 10/2021 | Thomas | G05D 1/0274 |
| 11,155,247 B1 * | 10/2021 | Ebrahimi Afrouzi | B62D 33/0636 |
| 2019/0187714 A1 * | 6/2019 | He | H02S 20/00 |
| 2019/0239710 A1 * | 8/2019 | Lee | A47L 9/2826 |
| 2020/0341472 A1 * | 10/2020 | Zenner | B60L 53/16 |
| 2022/0076683 A1 * | 3/2022 | Lee | G10L 15/02 |

FOREIGN PATENT DOCUMENTS

JP 2010-273244 A 12/2010

* cited by examiner

*Primary Examiner* — Disler Paul
(74) *Attorney, Agent, or Firm* — Crowell & Moring LLP (57) ABSTRACT

An audio system includes an audio apparatus, a charger, and a conveyer. The audio apparatus includes a sound receiver to receive ambient sound, and a battery. The charger charges the battery of the audio apparatus. The conveyer includes a motor to transport the audio apparatus.

15 Claims, 8 Drawing Sheets

AUDIO SYSTEM AND METHOD OF CONTROLLING CONVEYER DEVICE

CROSS REFERENCE TO RELATED APPLICATION

This application is based on, and claims priority from, Japanese Patent Application No. 2019-115262, filed Jun. 21, 2019, the entire contents of which are incorporated herein by reference.

BACKGROUND

Technical Field

The disclosure relates to an audio system including an audio apparatus.

Background Information

There is known in the art a conference system including microphones placed at predetermined positions in a conference room (for example, Japanese Patent Application Laid Open Publication No. 2010-273244).

To charge each of the microphones, a user needs to connect microphones to a charger after having collected the microphones, and then return the microphones to predetermined positions after the charging. This requires time and effort.

SUMMARY

In view of the above circumstances, the disclosure has an object to provide a technique for charging an audio apparatus without a need for a user to move the audio apparatus.

To achieve the stated object, an audio system according to an aspect of the present disclosure includes an audio apparatus including: a sound receiver to receive ambient sound; and a battery; a charger to charge the battery of the audio apparatus; and a conveyer including a motor to transport the audio apparatus.

To achieve the stated object, an audio system according to an aspect of the present disclosure includes a plurality of audio apparatuses, each audio apparatus including: a sound receiver to receive ambient sound; and a battery; a charger to charge the battery each of the audio apparatuses; and a conveyer including a motor to transport each of the audio apparatuses to the charger.

To achieve the stated object, a method of controlling a conveyer according to an aspect of the present disclosure includes moving the conveyer to an audio apparatus using a motor of the conveyer, the audio apparatus comprising a sound receiver to receive ambient sound; holding the audio apparatus using a holder of the conveyer; and transporting the audio apparatus to a charger using the motor of the conveyer to charge a battery of the audio apparatus.

DESCRIPTION OF THE EMBODIMENTS

Figure 1:
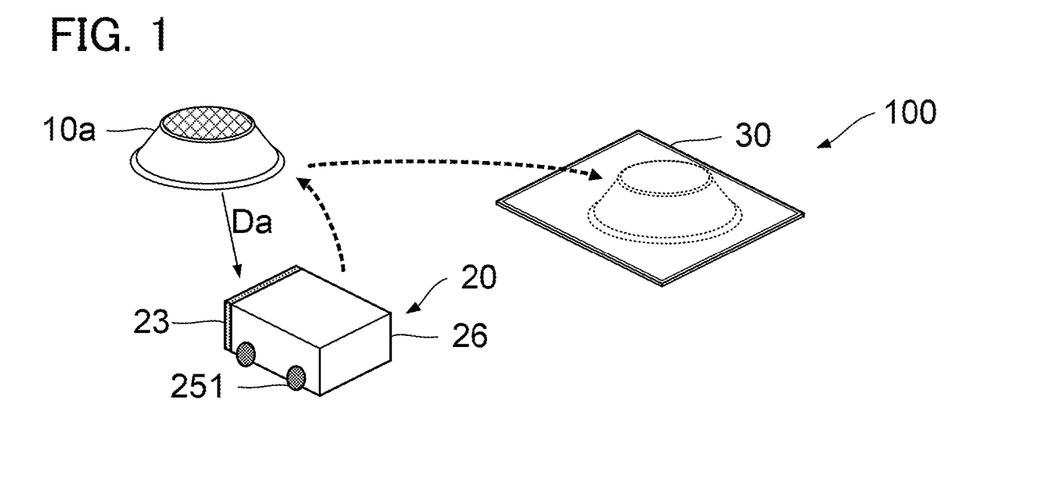
FIG. 1 is a perspective view illustrating a configuration of an audio system according to an embodiment of the present disclosure.

FIG. 1 is a perspective view illustrating a configuration of an audio system 100 according to an embodiment of the present disclosure. The audio system 100 includes an audio apparatus 10a, a conveyer 20, and a charger 30. For example, the audio system 100 is installed on a desk in an audio space, such as a conference room. The charger 30 and the conveyer 20 together is a charging system for charging the audio apparatus 10a. The conveyer 20 transports the audio apparatus 10a to the charger 30. The charger 30 charges the audio apparatus 10a transported by the conveyer 20.

Figure 2:
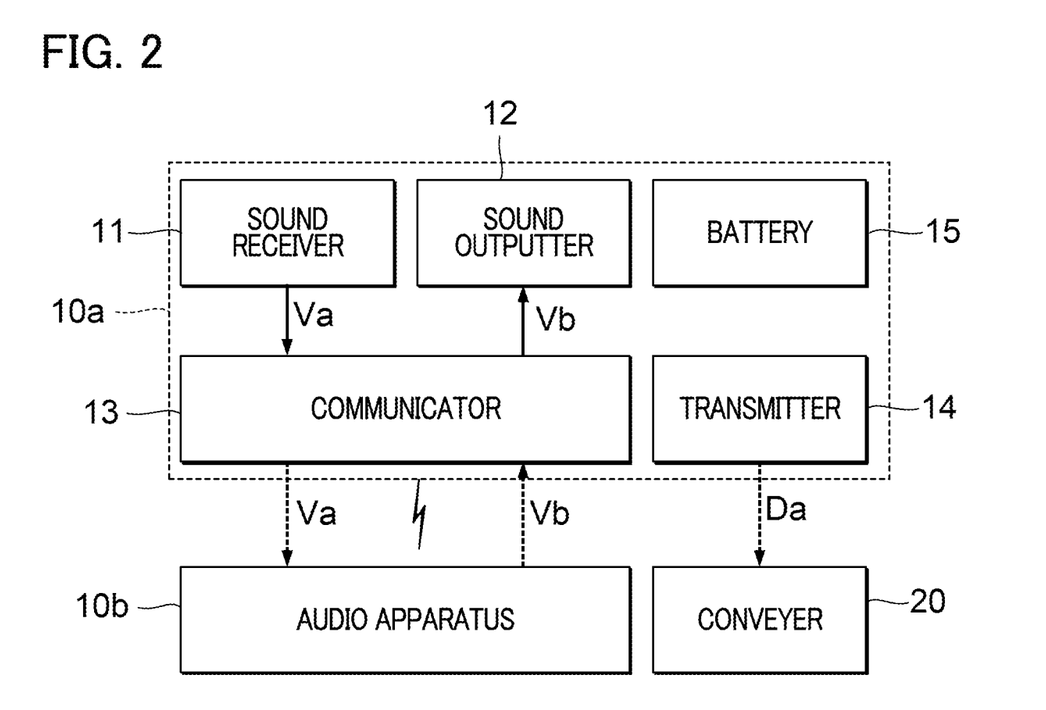
FIG. 2 is a block diagram illustrating a configuration of an audio apparatus.

FIG. 2 is a block diagram illustrating a configuration of the audio apparatus 10a. The audio apparatus 10a includes a sound receiver 11, a sound outputter 12, a communicator 13, a transmitter 14, and a battery 15. The sound receiver 11 is a microphone that generates an audio signal Va by receiving an ambient sound. For example, the sound receiver 11 receives speech uttered by participants of a conference held in the conference room.

The communicator 13 is communication equipment that is capable of communicating with another audio apparatus 10b via a communication network including a mobile communication network, the Internet, and/or the like. The audio apparatus 10b is installed, for example, in an audio space that is remote from the audio space in which the audio system 100 is installed. The audio apparatus 10b has a configuration that is substantially the same as that of the audio apparatus 10a. The same reference numbers as those for the audio apparatus 10a are used for the respective elements of the audio apparatus 10b, but their numbers are followed by "b" instead of by "a". The communicator 13 transmits the audio signal Va generated by the audio apparatus 10a to the audio apparatus 10b and receives an audio signal Vb transmitted by the audio apparatus 10b.

The sound outputter 12 is a loudspeaker that outputs a sound corresponding to the audio signal Vb received by the communicator 13. That is, a sound that is received by a sound receiver 11b in the audio apparatus 10b in the audio space in which the audio apparatus 10b is installed is emitted in the audio space in which the audio apparatus 10a is installed. As will be understood from the above explanations, the audio apparatus 10a and the audio apparatus 10b constitute a teleconference system that is capable of transmitting to, and receiving from, a counterpart audio apparatus, an audio signal representative of a sound received by the sound receiver 11a or 11b. The audio apparatus 10a may include an imaging device (a camera) that captures a moving image in the audio space.

The battery 15 is a secondary battery (a rechargeable battery) that accumulates power by charging. The audio apparatus 10a operates with the power stored in the battery 15. The transmitter 14 transmits instruction data Da to the conveyer 20. The instruction data Da is data for instructing the conveyer 20 to transport the audio apparatus 10a. The instruction data Da is transmitted in a radio signal by near field communication such as Bluetooth (registered trademark) or Wi-Fi (registered trademark). The transmitter 14 transmits the instruction data Da to the conveyer 20 when a remaining level of the battery 15 falls below a threshold.

The charger 30 in FIG. 1 is a battery charger that charges the audio apparatus 10a. The charger 30 is a non-contact charger that supplies power to the battery 15 of the audio apparatus 10a in a non-contact manner. The form of the charger 30 is, for example, a plate shape or a thin film shape. When the audio apparatus 10a is mounted on the surface of the charger 30, the battery 15 of the audio apparatus 10a is charged.

Figure 3:
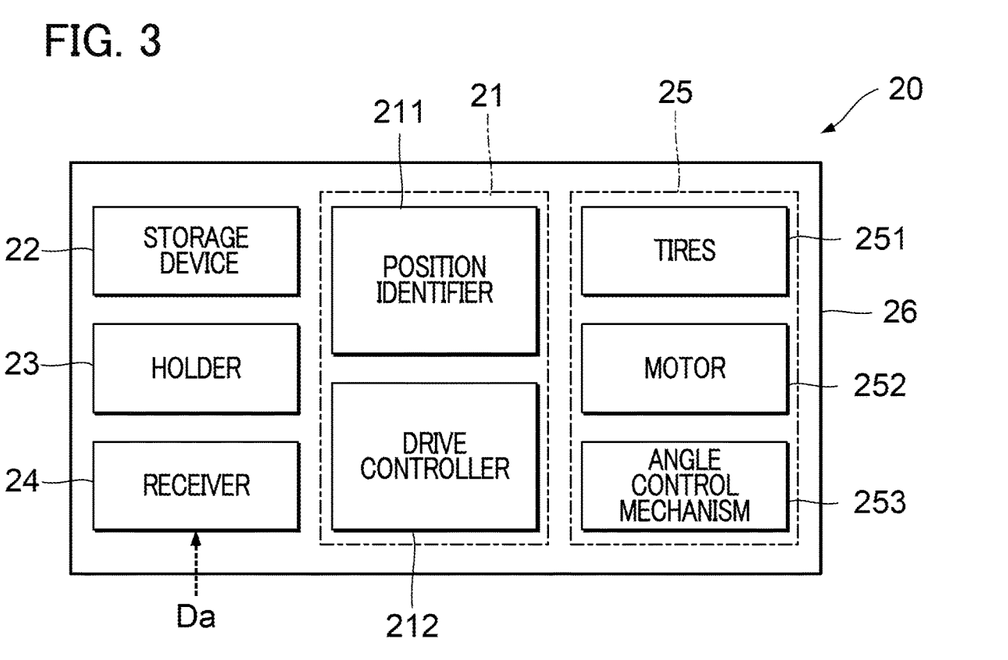
FIG. 3 is a block diagram illustrating a configuration of a conveyer.

FIG. 3 is a block diagram illustrating a configuration of the conveyer 20. The conveyer 20 is a mobile conveyer that transports the audio apparatus 10a. Specifically, the conveyer 20 includes a controller 21, a storage device 22, a holder 23, a receiver 24, a conveyer mechanism 25, and a housing 26. The housing 26 supports the receiver 24, the conveyer mechanism 25, the controller 21, the storage device 22, and the holder 23. The holder 23 holds the audio apparatus 10a. For example, the holder 23 is a magnet or a hook that can be coupled to the audio apparatus 10a. The conveyer 20 moves the audio apparatus 10a held by the holder 23. That is, the audio apparatus 10a is transported by the conveyer 20. The receiver 24 receives the instruction data Da transmitted from the audio apparatus 10a.

As shown in FIG. 1, upon receiving the instruction data Da, the conveyer 20 first moves to the audio apparatus 10a. Next, the conveyer 20 holds the audio apparatus 10a with the holder 23.
Subsequently, the conveyer 20 moves to the charger 30 while holding the audio apparatus 10a. That is, the audio apparatus 10a is transported to the charger 30 by the conveyer 20. Subsequently, the conveyer 20 mounts the audio apparatus 10a on the surface of the charger 30. The conveyer 20 then transports the audio apparatus 10a, after charging, to a predetermined position. The conveyer 20 transports the charged audio apparatus 10a to the position at which the audio apparatus 10a was placed before the charging.

The controller 21 includes, for example, one or a plurality of processors that control the elements of the conveyer 20. For example, the controller 21 includes one or more types of processors such as a Central Processing Unit (CPU), a Graphics Processing Unit (GPU), a Digital Signal Processor (DSP), a Field Programmable Gate Array (FPGA), or an Application Specific Integrated Circuit (ASIC). The storage device 22 comprises one or a plurality of memories that store programs executed by the controller 21 and various types of data used by the controller 21. The storage device 22 is a known recording medium such as a magnetic recording medium or a semiconductor recording medium.

The controller 21 functions as a position identifier 211 and a drive controller 212. The position identifier 211 identifies the position of the audio apparatus 10a and the position of the charger 30. Any known technique may be adopted as a method for identifying the position of the audio apparatus 10a and the position of the charger 30. For example, the position identifier 211 receives a radio signal (for example, an infrared signal or an ultrasonic signal) transmitted from the transmitter 14 of the audio apparatus 10a at each of at least three points. The strength of the radio signal decreases with increase in distance from the position of the position identifier 211 to the transmitter 14 of the audio apparatus 10a. The position identifier 211 identifies the position of the audio apparatus 10a on the basis of radio signal strength. The position of the audio apparatus 10a is identified, for example, in response to reception of the instruction data Da. Similarly, the position of the charger 30 is also identified on the basis of a radio signal transmitted from the charger 30.

The drive controller 212 controls the conveyer mechanism 25. Specifically, the drive controller 212 controls the conveyer mechanism 25 such that the conveyer 20 moves to the position of the audio apparatus 10a identified by the position identifier 211. The drive controller 212 also controls the conveyer mechanism 25 such that the conveyer 20 moves to the position of the charger 30. The conveyer mechanism 25 operates under control of the drive controller 212. As shown in FIG. 3, the conveyer mechanism 25 includes tires 251, a motor 252, and an angle control mechanism 253. The tires 251 are pivotally supported on the housing 26 of the conveyer 20. The motor 252 drives the tires 251 in accordance with an instruction from the drive controller 212. The angle control mechanism 253 changes the direction of the tires 251 in accordance with an instruction from the drive controller 212. Therefore, the conveyer 20 can move in any direction.

Figure 4:
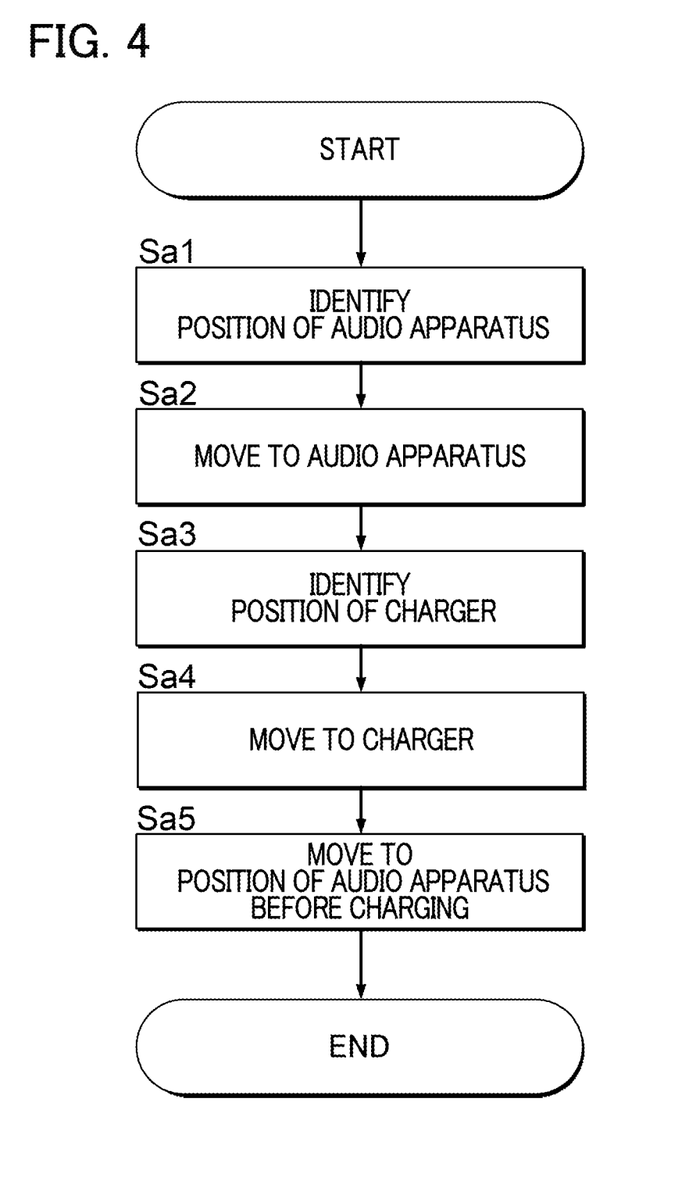
FIG. 4 is a flowchart illustrating an operation performed by a controller of the conveyer.

FIG. 4 is a flowchart of an operation performed by the controller 21 of the conveyer 20. Processing shown in FIG. 4 starts upon reception of the instruction data Da transmitted from the audio apparatus 10a. When the processing shown in FIG. 4 starts, the position identifier 211 identifies the position of the audio apparatus 10a (Step Sa1). The drive controller 212 controls the conveyer mechanism 25 to cause the conveyer 20 to move to the audio apparatus 10a (Step Sa2). Specifically, the drive controller 212 controls the conveyer mechanism 25 to cause the conveyer 20 to move to the position of the audio apparatus 10a identified by the position identifier 211. Upon moving to the audio apparatus 10a, the conveyer 20 holds the audio apparatus 10a with the holder 23.

Next, the position identifier 211 identifies the position of the charger 30 (Step Sa3). The drive controller 212 controls the conveyer mechanism 25 to cause the conveyer 20 holding the audio apparatus 10a to move to the charger 30 (Step Sa4). Specifically, the drive controller 212 controls the conveyer mechanism 25 to cause the conveyer 20 to move to the position of the charger 30 identified by the position identifier 211. Step Sa3 and Step Sa4 are processes in which the conveyer 20 transports the audio apparatus 10a to the charger 30. As is clear from the above explanations, the conveyer 20 transports the audio apparatus 10a to the charger 30 with reception of the instruction data Da as a trigger. That is, the audio apparatus 10a is transported to the charger 30 when the remaining level of the battery 15 in the audio apparatus 10a falls below a threshold.

The charger 30 charges the audio apparatus 10a transported by the conveyer 20. The charger 30 charges the audio apparatus 10a in a state in which the conveyer 20 holds the audio apparatus 10a. The charger 30 may charge the audio apparatus 10a in a state in which the conveyer 20 is distant from the audio apparatus 10a. In a case in which the charger 30 charges the audio apparatus 10a in a state in which the conveyer 20 is distant from the audio apparatus 10a, the conveyer 20 moves to the audio apparatus 10a after charging and holds the charged audio apparatus 10a. The drive controller 212 controls the conveyer mechanism 25 to cause the conveyer 20 holding the charged audio apparatus 10a to move to the original position of the audio apparatus 10a before charging (Step S*a*5). That is, the charged audio apparatus 10*a* is transported to the original position of the audio apparatus 10*a* before charging. For example, the charged audio apparatus 10*a* is transported to the position before charging via a path on which the audio apparatus 10*a*, before charging, has been transported to the charger 30.

As will be understood from the above explanations, since the audio apparatus 10*a* is transported to the charger 30 by the conveyer 20, a user of the audio apparatus 10*a* does not need to move the audio apparatus 10*a* to the charger 30. Furthermore, since the audio apparatus 10*a* is transported to the charger 30 when the remaining level of the battery 15 of the audio apparatus 10*a* falls below a threshold, it is possible to prevent the audio apparatus 10*a* from being transported to the charger 30 for unnecessary charging, for example, when a sufficient level remains in the battery 15 of the audio apparatus 10*a*.

When the remaining level of the battery 15 in the audio apparatus 10*a* falls below a threshold, the instruction data Da for instructing the conveyer 20 to transport the audio apparatus 10*a* is transmitted, and the conveyer 20 transports the audio apparatus 10*a* to the charger 30 with the reception of the instruction data Da acting as a trigger. Therefore, the configuration of the audio system 100 is simplified as compared to, for example, a configuration in which the audio apparatus 10*a*, at predetermined time intervals, transmits information indicating the remaining level of the battery 15 to the conveyer 20 and in which the conveyer 20 transports the audio apparatus 10*a* when it is determined that the remaining level indicated by the information is below a threshold.

Furthermore, since it is the conveyer 20 that transports the charged audio apparatus 10*a* to a predetermined position, the user does not need to transport the charged audio apparatus 10*a* to the predetermined position.

Figure 5:
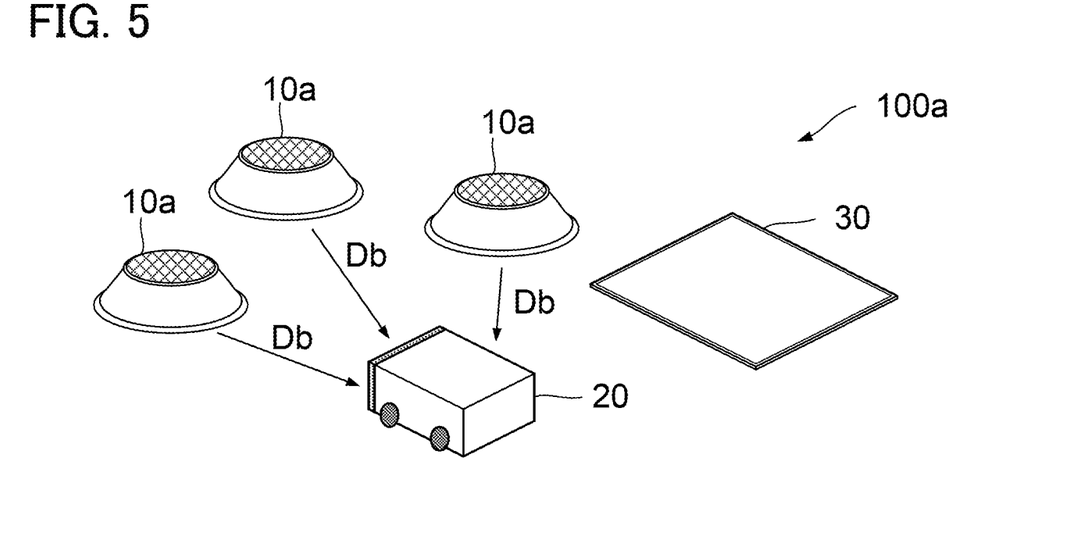
FIG. 5 is a perspective view illustrating a configuration of an audio apparatus according to an embodiment.

FIG. 5 is a perspective view of an audio system 100*a* according to an embodiment of the present disclosure is explained. In each aspect illustrated below, regarding elements having functions or effects identical to those of the audio system 100, reference signs the same as those used in the descriptions of the audio system 100 are used and detailed explanations of such elements are omitted as appropriate.

As shown in FIG. 5, the audio system 100*a* includes audio apparatuses 10*a*. Each of the audio apparatuses 10*a* has a configuration that is substantially the same as those in the audio system 100. However, the transmitter 14 of the audio system 100*a* transmits remaining level data Db, instead of the instruction data Da, to the conveyer 20. The remaining level data Db is information indicating the remaining level of the battery 15. Each of the audio apparatuses 10*a* can transmit the remaining level data Db to the conveyer 20 at any timing. For example, the remaining level data Db may be transmitted at predetermined time intervals. The transmitters 14 transmit the remaining level data Db with radio signals of different frequency bands from each other.

The receiver 24 of the conveyer 20 of the audio system 100*a* receives the remaining level data Db from each of the audio apparatuses 10*a*. The controller 21 of the audio system 100*a* functions as an order determiner as well as the position identifier 211 and the drive controller 212. The order determiner determines the order (hereinafter, "transport order") in which the audio apparatuses 10*a* are transported to the charger 30. Specifically, the order determiner determines the transport order according to the remaining level indicated by the remaining level data Db transmitted from each of the audio apparatuses 10*a*. The transport order is, for example, in ascending order of the remaining level indicated by the remaining level data Db. The conveyer 20 transports the audio apparatuses 10*a* to the charger 30 according to the transport order determined by the order determiner. That is, the audio apparatuses 10*a* are transported to the charger 30 in order from an audio apparatus 10*a* for which the remaining level of the battery 15 is the lowest.

Figure 6:
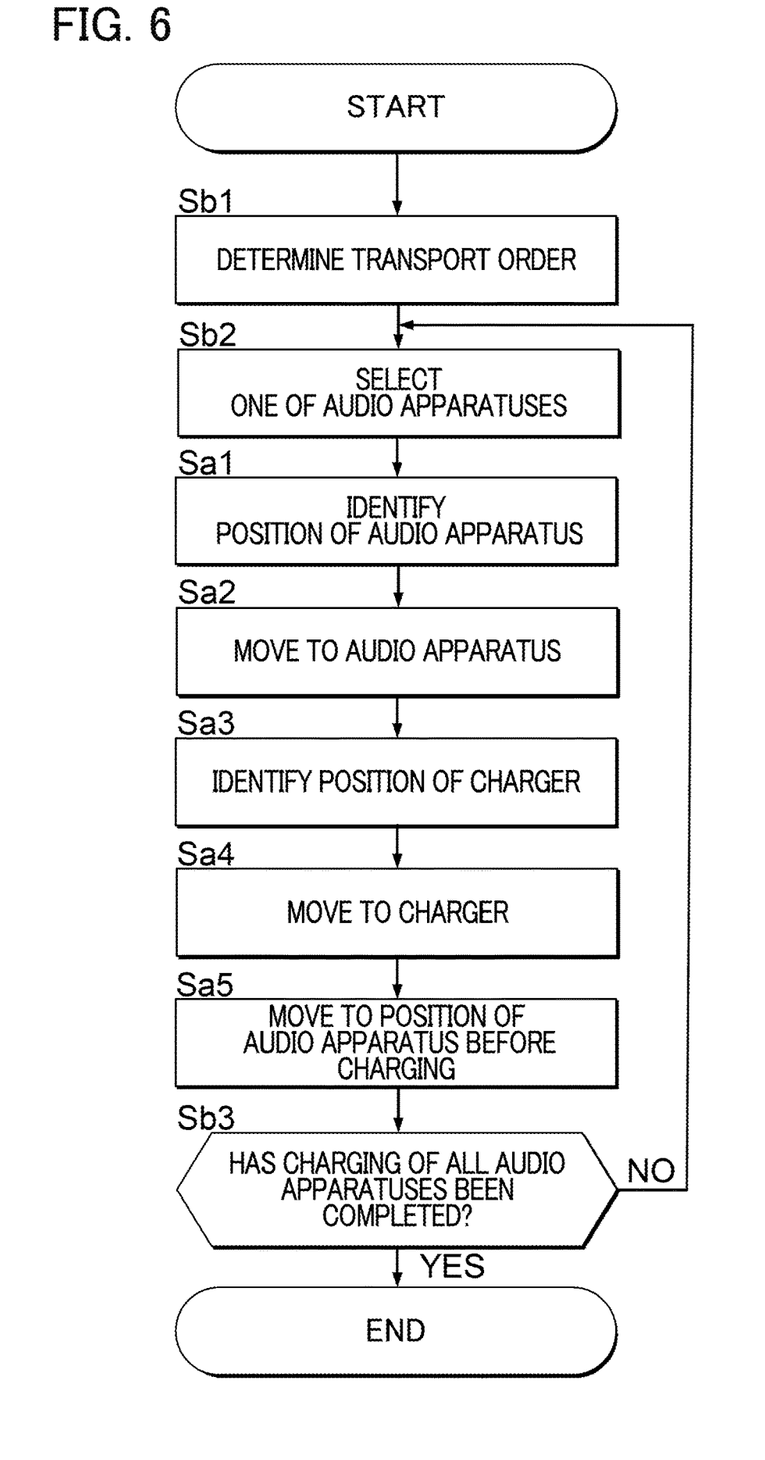
FIG. 6 is a flowchart illustrating an operation performed by the controller of the conveyer.

FIG. 6 is a flowchart of an operation performed by the controller 21 of the conveyer 20 according to the audio system 100*a*. Processing shown in FIG. 6 starts with reception of the remaining level data Db transmitted from each of the audio apparatuses 10*a* acting as a trigger. When the processing shown in FIG. 6 starts, the order determiner determines the transport order according to the remaining level indicated by the remaining level data Db transmitted from each of the audio apparatuses 10*a* (Step S*b*1). The position identifier 211 selects any one of the audio apparatuses 10*a* in accordance with the transport order (Step S*b*2). Specifically, the position identifier 211 sequentially selects the audio apparatuses 10*a* from the top in the transport order.

The position identifier 211 identifies the position of the selected audio apparatus 10*a* (Step S*a*1). Specifically, the position identifier 211 identifies the position of the selected audio apparatus 10*a* using a radio signal transmitted from the transmitter 14 of the audio apparatus 10*a*. Processes at Steps S*a*2 to S*a*5 are substantially the same as those in FIG. 4. The position identifier 211 determines whether charging of all the audio apparatuses 10*a* has been completed (Step S*b*3). Upon completion of charging of all the audio apparatuses 10*a* (YES in Step S*b*3), the processing shown in FIG. 6 ends. On the other hand, when there are audio apparatuses 10*a* which have not yet been charged among the audio apparatuses 10*a* (NO in Step S*b*3), the audio apparatuses 10*a* which have not yet been charged among the audio apparatuses 10*a* are selected according to the transport order (Step S*b*2).

Similarly to the audio system 100, also in the audio system 100*a*, an effect is realized in which the user does not need to move the audio apparatuses 10*a* to the charger 30. In the audio system 100*a*, the audio apparatuses 10*a* are transported to the charger 30 in the transport order according to the remaining level indicated by the remaining level data Db transmitted from each of the audio apparatuses 10*a*. Therefore, the audio apparatuses 10*a* can be efficiently charged.

Similarly to the audio system 100, each of the audio apparatuses 10*a* may transmit the instruction data Da to the conveyer 20 when the remaining level of the battery 15 falls below a threshold. The conveyer 20 transports to the charger 30, from among the audio apparatuses 10*a*, an audio apparatus 10*a* that has transmitted the instruction data Da. The conveyer 20 may transport, from among the audio apparatuses 10*a*, only an audio apparatus 10*a* for which the remaining level indicated by the remaining level data Db is below the threshold to the charger 30, such that the charger 30 charges the transported audio apparatus 10*a* only. In the present disclosure, the audio apparatuses 10*a* do not necessarily have to be transported in the transport order. That is, the audio apparatuses 10*a* may be sequentially transported irrespective of a specific order. In this case, the order determiner may be omitted.

Figure 7:
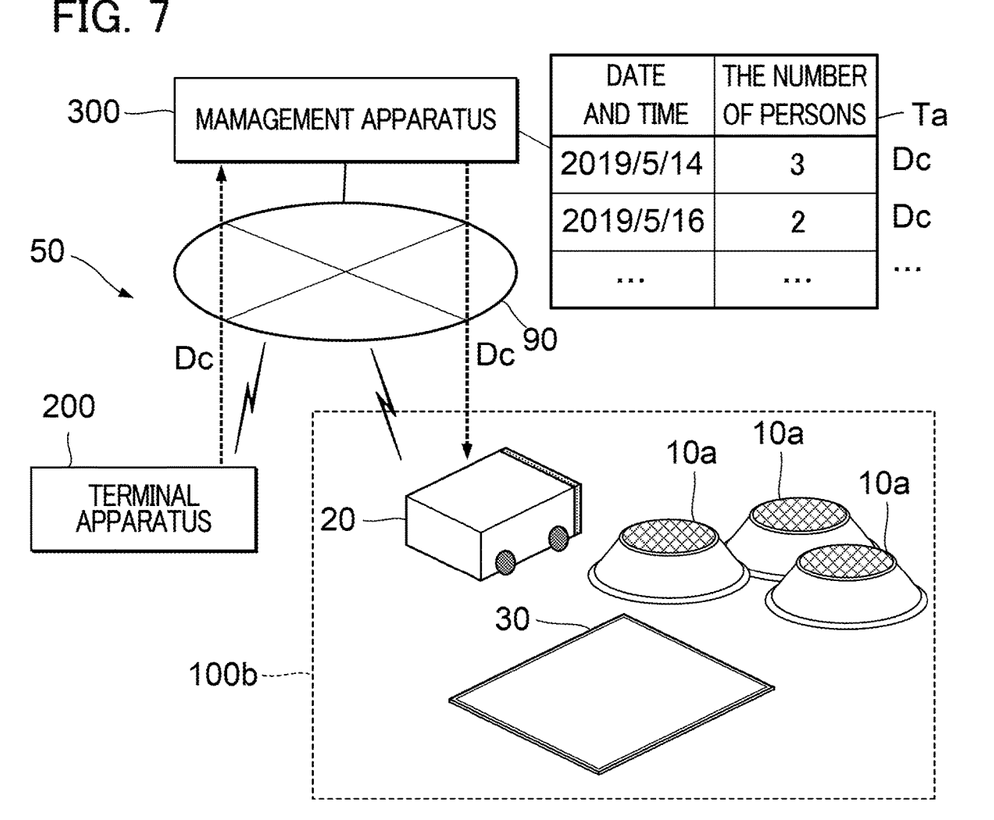
FIG. 7 is a block diagram illustrating a configuration of a conference reservation system according to an embodiment.

FIG. 7 is a block diagram illustrating a configuration of a conference room reservation system 50 according to an embodiment of the present disclosure. As shown in FIG. 7, the conference room reservation system 50 includes an audio system 100*b*, a terminal apparatus 200, and a management apparatus 300. The audio system 100*b* and the terminal apparatus 200 are capable of communicating with the management apparatus 300 via a communication network 90 including, for example, a mobile communication network, the Internet, and/or the like.

A user reserves a conference room in which the audio system 100b is installed, using the terminal apparatus 200. The terminal apparatus 200 is, for example, a transportable information terminal such as a mobile phone or a smartphone. The terminal apparatus 200 may be a transportable or stationary information terminal such as a personal computer. For example, the user inputs the date and time at which the conference room is to be used and the number of persons using the conference room, to the terminal apparatus 200. Upon reception of input from the user, the terminal apparatus 200 transmits reservation data Dc to the management apparatus 300. The reservation data Dc is indicative of the date and time (hereinafter, "reservation date and time") at which the conference room is to be used and the number of persons (hereinafter, "reservation number of persons"). Although there is a plurality of terminal apparatuses 200 in practice, one terminal apparatus 200 is shown in FIG. 7 for convenience.

The management apparatus 300 is a server apparatus (for example, a web server) that manages conference room reservations. Specifically, the management apparatus 300 provides conference room availability information to the user of the terminal apparatus 200. The management apparatus 300 registers the reservation data Dc transmitted from the terminal apparatus 200 in a management table Ta. Since the reservation data Dc is transmitted from more than one of the terminal apparatuses 200 in practice, the management apparatus 300 registers reservation data Dc transmitted from different terminal apparatuses 200 in the management table Ta. In the meantime, upon reception of the reservation data Dc from the terminal apparatus 200, the management apparatus 300 transmits the reservation data Dc to the audio system 100b. The management apparatus 300 can transmit the reservation data Dc to the audio system 100 at any timing. For example, the management apparatus 300 may transmit the reservation data Dc to the audio system 100b when the reservation date and time indicated by the reservation data Dc approaches. Alternatively, the management apparatus 300 may transmit the reservation data Dc registered in the management table Ta to the audio system 100b in response to an information request from the audio system 100b.

Figure 8:
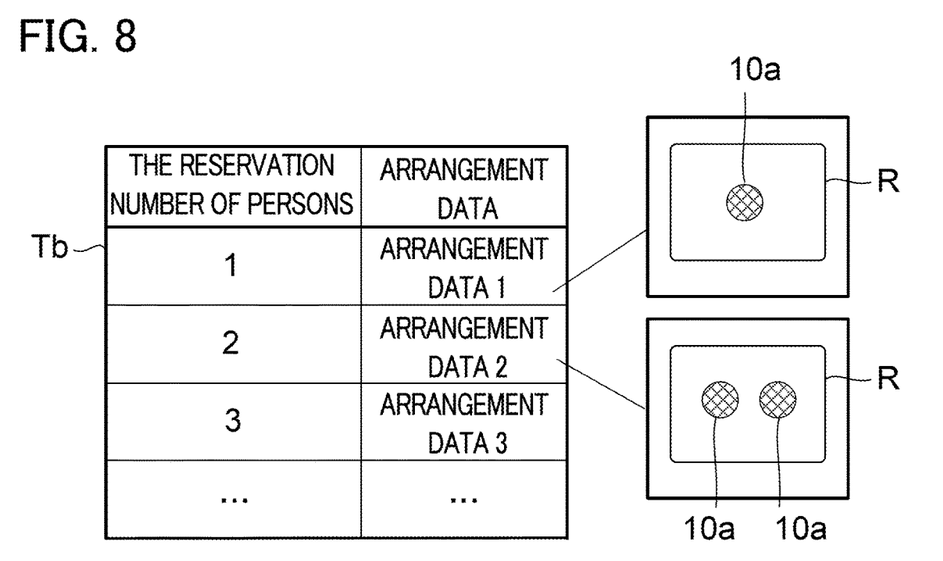
FIG. 8 is a schematic diagram illustrating an arrangement table.

Similarly to the audio system 100, the audio system 100b includes the audio apparatus 10a, the conveyer 20, and the charger 30. The audio system 100b includes more than one (for example, three) audio apparatuses 10a. Any number of audio apparatuses 10a may be included in the audio system 100b. The conveyer 20 of the audio system 100b is provided with a communicator capable of communicating with the management apparatus 300 in addition to the elements provided in the conveyer 20 of the audio system 100. The communicator of the conveyer 20 receives the reservation data Dc transmitted from the management apparatus 300. The storage device 22 of the audio system 100b stores the reservation data Dc received by the communicator and an arrangement table Tb shown in FIG. 8. There are stored different reservation numbers of persons, each being associated with arrangement data, in the arrangement table Tb. The arrangement data indicates a number of audio apparatuses 10a that correspond to the reservation number of persons, and positions at which the audio apparatuses 10a are to be arranged on a desk R in the conference room.

The conveyer 20 transports the audio apparatuses 10a to the charger 30 in accordance with the reservation data Dc stored in the storage device 22. Specifically, the conveyer 20 starts transporting the audio apparatuses 10a to the charger 30 such that charging the audio apparatuses 10a is completed before the reservation date and time indicated by the reservation data Dc.

Upon completion of charging the audio apparatuses 10a, the conveyer 20 transports the charged audio apparatuses 10a to positions determined in accordance with the reservation data Dc. Specifically, the conveyer 20 first identifies arrangement data that corresponds to the reservation number of persons indicated by the reservation data Dc in the arrangement table Tb. Next, the conveyer 20 transports the audio apparatuses 10a to the positions (examples of a predetermined position) indicated by the identified arrangement data. The conveyer 20 transports the audio apparatuses 10a, the number of which is identical to the number indicated by the identified arrangement data, to the charger 30, and transports the charged audio apparatuses 10a to the positions indicated by the arrangement data after charging. For example, when the reservation number of persons indicated by the reservation data Dc is two, two audio apparatuses 10a are respectively arranged at different positions on the desk R after being charged, where the positions are as indicated by the arrangement data in FIG. 8. As will be understood from the above explanations, charging the audio apparatuses 10a and arranging the charged audio apparatuses 10a is performed in accordance with contents of the reservation of the conference room. Charging and arranging the audio apparatuses 10a is performed at any time during a time period in which the conference room is available.

Figure 9:
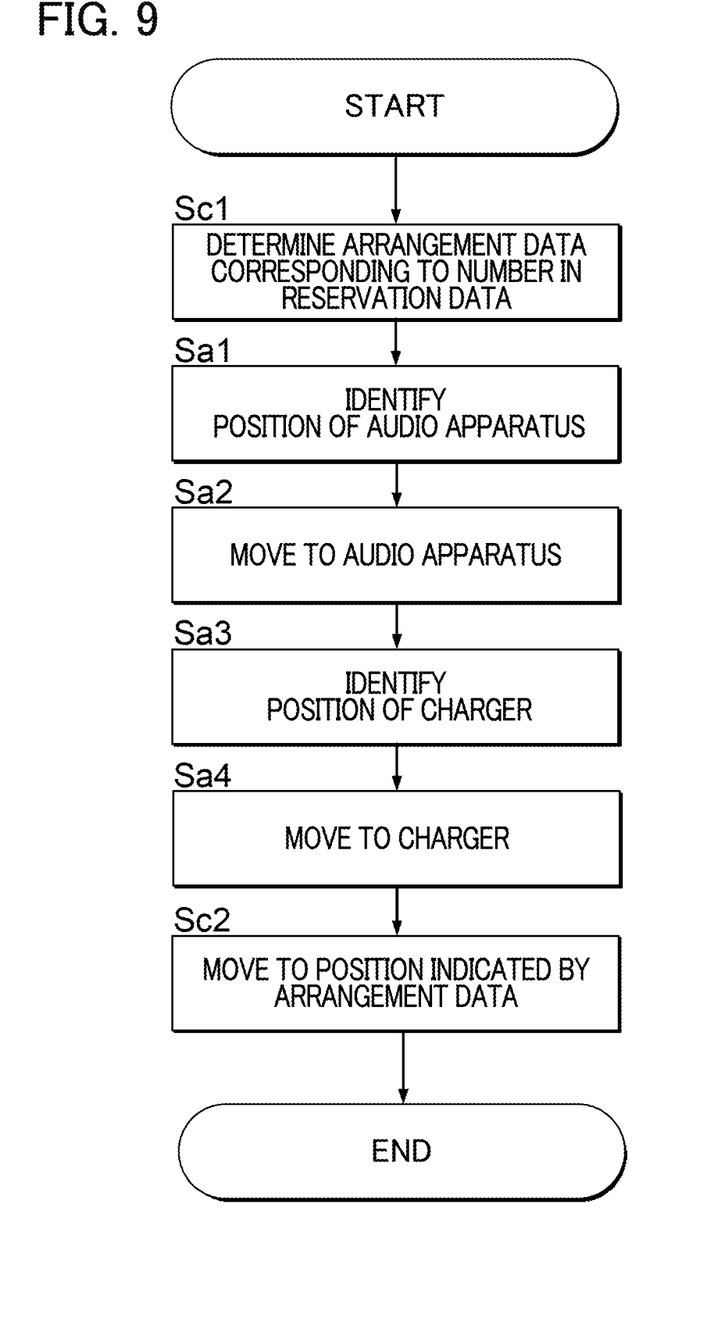
FIG. 9 is a flowchart illustrating an operation performed by the controller of the conveyer.

FIG. 9 is a flowchart of an operation performed by the controller 21 of the conveyer 20 according to the audio system 100b. Processing shown in FIG. 9 is performed according to the reservation date and time indicated by the reservation data Dc in the storage device 22. When the processing shown in FIG. 9 starts, the controller 21 identifies arrangement data corresponding to the reservation number of persons of the reservation data Dc among different arrangement data in the arrangement table Tb (Step Sc1). Steps Sa1 to Sa4 that are substantially the same as those in FIG. 4 are performed for audio apparatuses 10a, the number of which is identical to the number indicated by the specified arrangement data, among the audio apparatuses 10a in the audio system 100b. When Step Sa4 is performed, the drive controller 212 controls the conveyer mechanism 25 such that the conveyer 20 holding the charged audio apparatuses 10a moves to the positions indicated by the arrangement data (Step Sc2). As will be understood from the above explanations, the audio apparatuses 10a, the number of which is identical to the number indicated by the arrangement data, are arranged at the positions indicated by the arrangement data.

As explained above, in the audio system 100b, since the conveyer 20 transports the audio apparatuses 10a according to the reservation data Dc, charging and arrangement of the audio apparatuses 10a can be appropriately performed according to contents of the reservation of the conference room in which the audio system 100b is installed. In the case of charging a plurality of audio apparatuses 10a, the audio apparatuses 10a may be charged in the transport order illustrated in the audio system 100a.

Modifications

Each aspect illustrated above may be variously modified. Specific modified aspects are illustrated below. Two or more aspects freely selected from the following descriptions may be combined with one another as appropriate within a range in which there is no conflict.

(1) In the embodiments described above, the charger 30 charges the audio apparatus 10a in a non-contact manner. However, the charging method is not limited to the example illustrated above. For example, the charger 30 may charge the audio apparatus 10a in a contact manner in which a terminal of the audio apparatus 10 is connected to a terminal of the charger 30.

That is, any type of the charger 30 may be used.

(2) In the embodiments described above, the conveyer 20 transports the audio apparatus 10a by a method in which the conveyer 20 moves while the holder 23 holds the audio apparatus 10a. However, the audio apparatus 10a may be transported by any method. For example, the conveyer 20 may include a mounting stand on which the audio apparatus 10a is to be mounted. Furthermore, the audio apparatus 10a may include, for example, spherical tires. In this configuration, the tires of the audio apparatus 10a held by the conveyer 20 rotates with movement of the conveyer 20, and therefore, the audio apparatus 10a can be transported more easily.

(3) In the audio system 100a, the order determiner determines the transport order according to the remaining level of the battery 15 indicated by the remaining level data Db. However, the order determiner may determine the transport order on the basis of data other than the remaining level data Db. For example, the order determiner may determine the transport order on the basis of usage data indicating the frequency of usage of an audio apparatus 10a. The usage data is transmitted from each of the audio apparatuses 10a to the conveyer 20. For example, the order determiner determines the descending order of the usage frequency indicated by the usage data as the transport order. Therefore, the audio apparatuses 10a are charged sequentially from an audio apparatus 10a at which the usage frequency is the highest. The order determiner may determine the transport order on the basis of distances between each of audio apparatuses 10a and the conveyer 20. For example, the order determiner determines the ascending order of the distances as the transport order. The order determiner may determine the descending order of the distances as the transport order.

(4) The audio apparatus 10a transmits the instruction data Da to the conveyer 20 when the remaining level of the battery 15 falls below the threshold in the audio system 100. However, the audio apparatus 10a may transmit the instruction data Da to the conveyer 20 at any timing. For example, the audio apparatus 10a may transmit the instruction data Da at any timing when the audio apparatus 10a is not used. The audio apparatus 10a may transmit the instruction data Da at predetermined time intervals. The audio apparatus 10a may transmit the instruction data Da at a timing when use of the audio apparatus 10a ends. Furthermore, it is not essential in the present disclosure that the audio apparatus 10a transmit the instruction data Da. For example, the conveyer 20 may transport the audio apparatus 10a to the charger 30 at any time while the audio apparatus 10a is not used, without receiving the instruction data Da.

In the audio system 100, the audio apparatus 10a may transmit the remaining level data Db to the conveyer 20. For example, the remaining level data Db is transmitted to the conveyer 20 at predetermined time intervals. The conveyer 20 transports the audio apparatus 10a to the charger 30 when the remaining level indicated by the remaining level data Db transmitted from the audio apparatus 10a falls below a predetermined threshold.

(5) The conveyer 20 in the embodiments described above includes a battery (hereinafter, "conveyer battery") for driving the conveyer 20. The conveyer battery is a secondary battery (a rechargeable battery) that accumulates power by being charged. The charger 30 may be used to charge the conveyer battery. The conveyer 20 moves to the charger 30, for example, when the remaining level of the conveyer battery mounted therein falls below a threshold. The charger 30 then charges the conveyer battery.

The conveyer battery of the conveyer 20 may be used to charge the battery 15 of the audio apparatus 10a. For example, the conveyer 20 compares the remaining level indicated by the remaining level data Db transmitted from the audio apparatus 10a with the remaining level of the conveyer battery. When the remaining level of the conveyer battery is above the remaining level indicated by the remaining level data Db, the conveyer 20 charges the battery 15 of the audio apparatus 10a using the conveyer battery. For example, in a situation in which the holder 23 has a charging terminal that is connectable with the audio apparatus 10a, the conveyer 20 supplies power of the conveyer battery to the battery 15 via the charging terminal. That is, the conveyer 20 does not need to transport the audio apparatus 10a to the charger 30. On the other hand, when the remaining level of the conveyer battery is below the remaining level indicated by the remaining level data Db, the conveyer 20 transports the audio apparatus 10a to the charger 30 without performing charging using the conveyer battery. In the configuration described above, the conveyer 20 has, for example, a conveyer battery with a sufficiently large capacity (for example, a conveyer battery with a larger capacity than that of the battery 15 of the audio apparatus 10a). Upon determination that the conveyer battery has a sufficient remaining level for charging the battery 15, the conveyer 20 may charge the battery 15 of the audio apparatus 10a using the conveyer battery.

Figure 10:
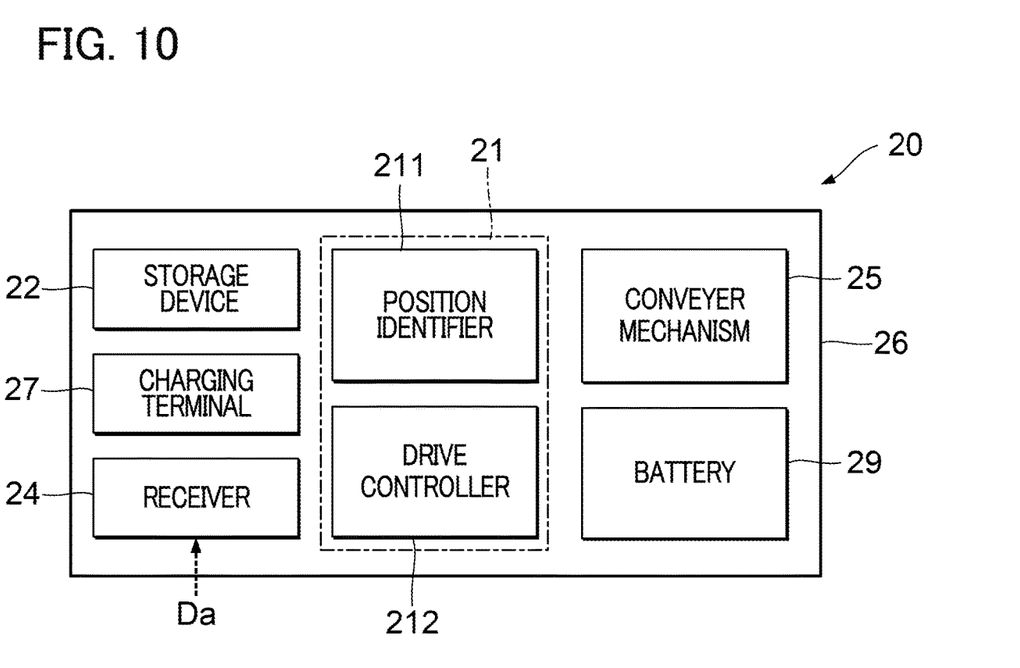
FIG. 10 is a schematic diagram illustrating a configuration of a conveyer according to a modification.

(6) While the stationary charger 30 is used in the embodiments described above, the conveyer 20 may have the functions of the charger 30. As shown in FIG. 10, the conveyer 20 includes, for example, a charging terminal 27 connectable with the audio apparatus 10a, and a battery 29 for charging the audio apparatus 10a, in addition to the controller 21, the storage device 22, the conveyer mechanism 25, and the receiver 24. The controller 21, the storage device 22, the conveyer mechanism 25, and the receiver 24 have identical configurations to those in the audio system 100. Upon reception of the instruction data Da, the conveyer 20 moves to the audio apparatus 10a and supplies power of the battery 29 to the audio apparatus 10a through the charging terminal 27. That is, the charger 30 is omitted from the audio systems 100, 100a, and 100b.

(7) In the embodiments described above, the position identifier 211 identifies the position of the audio apparatus 10a on the basis of a radio signal transmitted from the transmitter 14 of the audio apparatus 10a. However, the position of the audio apparatus 10a may be identified by any method. For example, the audio apparatus 10a may transmit position data indicating the position of the audio apparatus 10a to the conveyer 20 with a radio signal. For example, the position data indicates the position (absolute coordinates) of the audio apparatus 10a with a desk on which the audio apparatus 10a is placed as the plane of the coordinates. An apparatus different from the audio apparatus 10a may transmit the position data of the audio apparatus 10a to the conveyer 20. Alternatively, the position data of the audio apparatus 10a may be registered in advance in the conveyer 20. In this configuration, the audio apparatus 10a does not need to transmit the position data. Similarly, the position of the charger 30 may be identified by any method.

(8) In the audio system 100, the charger 30 may receive the instruction data Da. In this configuration, the charger 30, having received the instruction data Da, transmits a signal instructing transport of the audio apparatus 10*a* to the conveyer 20, and the conveyer 20 having received the signal transports the audio apparatus 10*a* to the charger 30. Also in the audio system 100*a*, the charger 30 may receive the remaining level data Db. In this configuration, the charger 30 determines the transport order and transmits a signal instructing transport of the audio apparatuses 10*a* in an order according to the transport order, to the conveyer 20. That is, the order determiner is omitted from the conveyer 20.

(9) In the embodiments described above, the conveyer 20 transports the audio apparatus 10*a* to the charger 30. However, the apparatus transported by the conveyer 20 is not limited to the audio apparatus 10*a*. For example, the conveyer 20 may be used to transport various devices such as the sound receiver 11, the sound outputter 12, the imaging device, a display device, or an illuminating device.

(10) In the audio system 100*b*, a user inputs the reservation date and time and the reservation number of persons for a conference room using the terminal apparatus 200. However, information input by a user at the time of reservation of the conference room is not limited to the reservation date and time and the reservation number of persons. For example, information designating seats of participants of the conference, or the number of audio apparatuses 10*a* to be used may be input by a user to the terminal apparatus 200. The terminal apparatus 200 transmits the reservation data Dc including the information input by the user to the management apparatus 300. That is, the reservation data Dc may include information different from the reservation date and time and the reservation number of persons.

(11) In the audio system 100*b*, the charged audio apparatuses 10*a* are transported according to the arrangement data. However, for example, in a case in which a user designates the number of audio apparatuses 10*a* to be used and the positions thereof, the audio apparatuses 10*a* are transported according to contents designated by the user. For example, the user inputs the number of audio apparatuses 10 and the positions thereof to the terminal apparatus 200, and the terminal apparatus 200 transmits the input contents to the management apparatus 300. The management apparatus 300 transmits the number of audio apparatuses 10*a* and the positions thereof transmitted from the terminal apparatus 200, to the conveyer 20. The conveyer 20 transports the audio apparatuses 10*a* according to the number of audio apparatuses 10*a* and the positions thereof.

(12) In the embodiments described above, the conveyer 20 transports the charged audio apparatus 10*a* to a predetermined position. However, it is not essential in the present disclosure that the charged audio apparatus 10*a* be transported to a predetermined position.

(13) The functions of the conveyer 20 illustrated above are realized by cooperation of one processor or a plurality of processors constituting the controller 21 and a program stored in the storage device 22 as described above. The program according to the present disclosure may be provided in a form of being stored in a computer readable recording medium, and installed in the computer. The recording medium is, for example, a non-transitory recording medium. The recording medium includes an optical recording medium (an optical disk) such as a CD-ROM. The recording medium also includes a recording medium of any known form, such as a semiconductor recording medium or a magnetic recording medium. The non-transitory recording medium includes any recording medium except for recording mediums recording a transitory, propagating signal, and does not exclude a volatile recording medium. Furthermore, in a configuration in which a distribution device distributes the program via a communication network, the storage device 22, which stores the program, within the distribution apparatus, corresponds to the non-transitory recording medium described above.

Other Matters

For example, the following configurations are understood based on the embodiments exemplified above.

An audio system according to one aspect (a first aspect) of the present disclosure includes one or more audio apparatuses each including a sound receiver configured to receive an ambient sound; a charger configured to charge the audio apparatus; and a movable conveyer configured to transport the audio apparatus to the charger. According to the above configuration, the audio apparatus is transported by the conveyer to the charger. Therefore, a user does not need to move the audio apparatus to the charger.

In the audio system according to one example (a second aspect) of the first aspect, the conveyer transports the audio apparatus to the charger when a remaining level of a battery in the audio apparatus falls below a threshold. According to the above configuration, when the remaining level of the battery in an audio apparatus falls below the threshold, the audio apparatus is transported to the charger. Therefore, for example, when the battery in an audio apparatus has a sufficient remaining level, the conveyer does not need to transport the audio apparatus to the charger.

In the audio system according to one example (a third aspect) of the second aspect, the audio apparatus transmits instruction data instructing transport to the conveyer when the remaining level of the battery in the audio apparatus falls below the threshold, and the conveyer transports the audio apparatus to the charger with reception of the instruction data as a trigger. According to the above configuration, when the remaining level of the battery in an audio apparatus falls below the threshold, the instruction data is transmitted to the conveyer, and the conveyer transports the audio apparatus to the charger with reception of the instruction data as a trigger. Therefore, the configuration of the audio system is simplified, for example, as compared to a configuration in which the audio apparatus transmits information indicating the remaining level of the battery to the conveyer with a predetermined period, and the conveyer transports the audio apparatus when it is determined that the remaining level indicated by the information falls below a threshold.

In the audio system according to one example (a fourth aspect) of the first aspect, the one or more audio apparatuses are a plurality of audio apparatuses, each of the audio apparatuses transmits remaining level data indicating a remaining level of the battery of the audio apparatus to the conveyer, and the conveyer transports the audio apparatuses to the charger in an order according to remaining levels indicated by the remaining level data respectively transmitted from the audio apparatuses. According to the above configuration, audio apparatuses are transported to the conveyer in an order according to the remaining levels indicated by the remaining level data respectively transmitted from the audio apparatuses. Therefore, the audio apparatuses can be efficiently charged.

In the audio system according to one example (a fifth aspect) of any of the first to fourth aspects, the conveyer transports the audio apparatuses that have been charged to a predetermined position. According to the above configuration, the conveyer transports charged audio apparatuses to a predetermined position. Therefore, a user does not need to transport the charged audio apparatuses to a predetermined position.

DESCRIPTION OF REFERENCE SIGNS

100: audio system, 10: audio apparatus, 11: sound receiver, 12: sound outputter, 13: communicator, 14: transmitter, 15: battery, 20: conveyer, 200: terminal apparatus, 21: controller, 211: position identifier, 212: drive controller, 22: storage device, 23: holder, 24: receiver, 25: conveyer mechanism, 251: tire, 252: motor, 253: angle control mechanism, 26: housing, 27: charging terminal, 29: battery, 30: charger, 300: management apparatus.

What is claimed is:

1. An audio system comprising:
   a plurality of audio apparatuses, each audio apparatus comprising:
      a sound receiver configured to generate an audio signal by receiving ambient sound;
      a battery; and
      a communicator configured to transmit the audio signal to another audio apparatus of the plurality of audio apparatuses;
   a charger configured to charge the battery each of the audio apparatuses; and
   a conveyer comprising:
      a motor configured to drive the conveyer to each of the audio apparatuses; and
      a charging terminal configured to charge the battery of each audio apparatus wherein:
      each of the audio apparatuses is driven using the battery as a power supply;
      each of the audio apparatuses further comprise a transmitter to transmit remaining level data of the battery to the conveyer;
      the conveyer further comprises:
         a receiver configured to receive the remaining level data respectively transmitted from the audio apparatuses; and
         a controller configured to determine an order to transport the audio apparatuses to the charger based on the remaining level data.

2. The audio system according to claim 1, wherein the conveyer is configured to drive to each of the audio apparatuses on a desk.

3. An audio system comprising:
   a first audio apparatus comprising:
      a sound receiver configured to generate an audio signal by receiving ambient sound;
      a battery; and
      a communicator configured to transmit the audio signal to a second audio apparatus;
   a charger configured to charge the battery of the first audio apparatus; and
   a conveyer comprising a motor to transport the first audio apparatus, wherein
      the conveyer transports the first audio apparatus to a predetermined position in response to determining that the first audio apparatus has been charged, and
      the predetermined position is based on a seating position of a person indicated in a reservation.

4. The audio system according to claim 3, wherein the conveyer further comprises:
   a conveyer battery to charge the battery of the first audio apparatus.

5. The audio system according to claim 3, wherein the reservation further specifies a number of persons; and the conveyer is further configured to:
   transport a number of audio apparatuses matching the specified number of persons to a corresponding number of seating positions.

6. The audio system according to claim 3, wherein each of the audio apparatuses further comprise a transmitter to transmit remaining level data of the battery to the conveyer.

7. The audio system according to claim 3, wherein the first audio apparatus further comprises:
   a transmitter configured to transmit an instruction that instructs the conveyer to transport the first audio apparatus when a remaining level of the battery in the first audio apparatus falls below a threshold.

8. The audio system according to claim 7, wherein the conveyer further comprises a receiver to receive the instruction.

9. The audio system according to claim 3, wherein the conveyer is separate from the first audio apparatus.

10. A method of controlling a conveyer, comprising:
    moving the conveyer to a first audio apparatus using a motor of the conveyer, the first audio apparatus comprising:
       a sound receiver to generate an audio signal by receiving ambient sound; and
       a communicator to transmit the audio signal to a second audio apparatus;
    holding the first audio apparatus using a holder of the conveyer;
    transporting the first audio apparatus to a charger using the motor of the conveyer to charge a battery of the first audio apparatus; and
    transporting the first audio apparatus to a predetermined position in response to determining that the first audio apparatus has been charged,
    wherein
       the conveyer moves to the first audio apparatus in response to receiving a first instruction from the charger; and
       the charger transmits the first instruction to the conveyer in response to receiving a second instruction from the first audio apparatus.

11. The method according to claim 10, wherein the first and/or second instructions are transmitted using near field communication.

12. The method according to claim 10, further comprising:
    charging the battery of the first audio apparatus using a battery of the conveyer while transporting the first audio apparatus to a charger.

13. A method of controlling a conveyer, comprising:
    moving the conveyer to a first audio apparatus using a motor of the conveyer, the first audio apparatus comprising:
       a sound receiver to generate an audio signal by receiving ambient sound; and
       a communicator to transmit the audio signal to a second audio apparatus;
    holding the first audio apparatus using a holder of the conveyer;
    transporting the first audio apparatus to a charger using the motor of the conveyer to charge a battery of the first audio apparatus;

transporting the first audio apparatus to a predetermined position in response to determining that the first audio apparatus has been charged; and comparing a first remaining battery level of the first audio apparatus with a second remaining battery level of the conveyer.

14. The method according to claim 13, wherein the step of moving the conveyer occurs in response to receiving an instruction from the first audio apparatus.

15. The method according to claim 13, further comprising:

charging the battery of the first audio apparatus using a battery of the conveyer while transporting the first audio apparatus to a charger.

* * * * *